US005555046A

United States Patent [19]
Meyerhoefer

[11] Patent Number: 5,555,046
[45] Date of Patent: Sep. 10, 1996

[54] FLASH INDICATION AID FOR CAMERAS WITH MANUAL FLASH

[75] Inventor: Daniel T. Meyerhoefer, Penfield, N.Y.

[73] Assignee: Eastman Kodak Company, Rochester, N.Y.

[21] Appl. No.: 363,667

[22] Filed: Dec. 23, 1994

[51] Int. Cl.$^6$ .......................... G03B 15/03; G03B 17/18
[52] U.S. Cl. ................. 354/149.11; 354/471; 354/473
[58] Field of Search ........................... 354/471, 473, 354/127.1, 149.11, 411; 356/229–232

[56] References Cited

U.S. PATENT DOCUMENTS

| | | | |
|---|---|---|---|
| 456,869 | 7/1891 | Watkins | 354/411 |
| 1,170,538 | 2/1916 | Ide | 354/411 |
| 1,255,167 | 2/1918 | Howie | 354/411 |
| 4,804,992 | 2/1989 | Moriyama et al. | 354/471 |

FOREIGN PATENT DOCUMENTS

| | | | |
|---|---|---|---|
| 5-142700 | 6/1993 | Japan | G03C 3/00 |
| 6-317815 | 11/1994 | Japan | G02F 1/15 |

*Primary Examiner*—D. Rutledge
*Attorney, Agent, or Firm*—Peter J. Bilinski

[57] ABSTRACT

A device for a camera having a manually operated flash assembly includes a sensing element made from a photochromic, metameric or other material which is capable of producing visible optical density changes, such as color changes, based on the level of incident light impinging on the element. According to the invention, a reference standard having a specific optical density is adjacently positioned relative to the sensing element so that the respective optical densities can be compared prior to image capture in order to guide the user whether or not to use the flash.

10 Claims, 2 Drawing Sheets

FLASH INDICATION AID FOR CAMERAS WITH MANUAL FLASH

FIELD OF THE INVENTION

The invention relates generally to the field of photography, and in particular to cameras. More specifically, the invention relates to light-sensitive user aids for cameras having manually activated flash assemblies.

BACKGROUND OF THE INVENTION

Expensive electronic flash cameras have a light meter or other exposure measuring device contained within the camera which sense the amount of ambient light present for the scene being photographed and automatically fires the flash assembly if the sensed lighting conditions will not produce an effective exposure.

In a number of more inexpensive cameras, such as single use cameras manufactured by the Eastman Kodak Company and Fuji Photo Film Co., Ltd., the flash assembly is manually operated, typically by an actuable switch located on the exterior of the camera body which charges the flash assembly for firing when the shutter release button is depressed. Prior to capturing an image, the average user must make a decision, gauged on the amount of ambient lighting perceived visually by the user, whether or not to charge the flash assembly. Improper decisions regarding the use of the flash may subsequently produce inconsistent results, resulting in consumer dissatisfaction.

In some other instances, such as when there is indoor lighting, the user should be guided or reminded to activate the flash prior to image capture given that a high percentage of pictures requiring flash are taken under these conditions.

There is a need then, to provide an aid to consumers, preferably for inexpensive cameras having a manually operable flash assembly, which allows the user to correctly operate the flash when needed.

SUMMARY OF THE INVENTION

The present invention is directed to overcoming one or more of the problems set forth above. Briefly summarized, according to one aspect of the present invention, there is provided an apparatus for a camera having a body and a manually operated flash assembly, characterized by:

sensing means disposed on said camera body, and made from a material having properties which vary depending on the amount of incident light striking the sensing means; and reference means having a specific property value for comparing to said sensing means for visually indicating whether said flash assembly should be powered.

According to another aspect of the present invention, there is described a method for using a camera having a manually operated flash assembly comprising the steps of:

reading the optical density of a displayed light sensing element made from a material which varies in optical density depending on the amount of light incident thereupon;

comparing the optical density of the light sensing element with the optical density of an adjacently disposed reference standard having a fixed optical density; and activating the flash assembly if the optical density of the sensing element is markedly different than that of the reference standard.

An advantageous feature of the present invention is that enabling information is provided to the user for properly and consistently utilizing the manual flash assembly, thereby producing higher quality images and increasing user satisfaction.

Another advantageous advantage of the present invention is that a flash indication device is inexpensively provided without significant impact on the cost of the camera including such a device.

These and other aspects, objects, features and advantages of the present invention will be more clearly understood and appreciated from a review of the following Detailed Description of the Preferred Embodiments and appended claims, and by reference to the accompanying Drawings.

DETAILED DESCRIPTION OF THE INVENTION

Figure 1A:
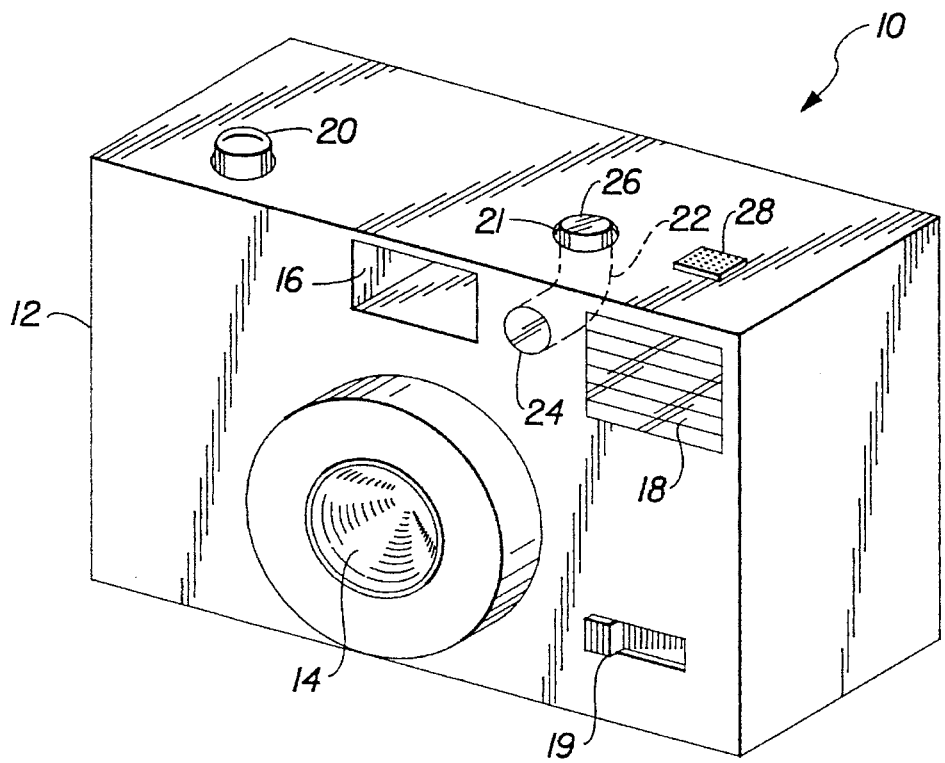
FIG. 1(a) is a front perspective view of a camera having a flash indication aid according to a first embodiment of the present invention.
Figure 1B:
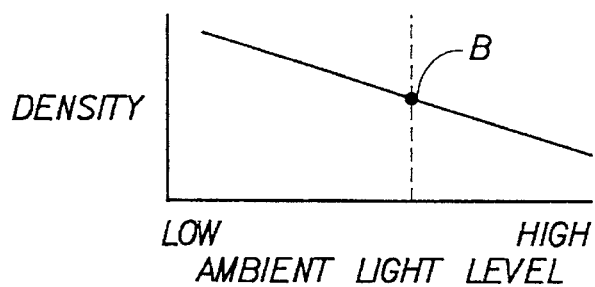
FIG. 1(b) is a graphical representation of the properties of the light pipe element of the flash indication aid of FIG. 1(a)
Figure 1C:
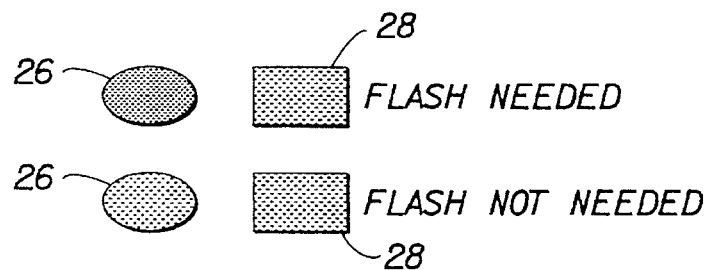
FIG. 1(c) illustrates the use of the flash indicating aid of FIGS. 1(a) and 1(b)

A first embodiment according to the present invention is described. Referring to FIGS. 1(a)–1(c), and specifically to FIG. 1(a), there is provided a camera, such as the FUN-SAVER™ single-use camera 10 manufactured by Eastman Kodak Company which is defined by a plastic body 12 having a taking lens 14 attached to the front portion of the body along with a viewfinder 16, a flash illumination assembly 18 powered for use by a manually activatable charging switch 19 located on the front of the body 12, and a shutter release button 20. Electronics (not shown) between the shutter release button 20 and the flash assembly 18 allows the firing of the flash after the charging switch 19 is activated by the user, as is commonly known. Further, each of the above described features and their method of operation are commonly known to one of ordinary skill in the field of photography. Therefore, further discussion relating to these features is not required.

A light-pipe element 22 is provided in a cavity 21 of the body 12 and includes a light gathering end 24 extending from the front exterior surface of the body 12, and a viewing end 26 extending from the top surface of the body. The light-pipe element 22 is made from PVC or other similar material which allows allow light transmission from the light-receiving end 24 to the viewing end 26, such as when the light-pipe element is exposed to ambient light. In addition, the viewing end 26 is preferably treated with a dye, such as $T_1O_2$ or other similar material, which changes optical density, such as by changing color, based on the amount of light transmitted through the light-pipe element 22 from the light receiving end 24.

A reference strip 28 is adhered or otherwise attached to the top surface of the body 12, preferably adjacent the viewing end 26 of the light-pipe element 22.

The dye in the viewing end 26 causes the light-pipe element 22 to vary in optical density, as shown in FIG. 1(b), such that the optical density of the viewing end 26 decreases with a corresponding increase in illumination; in this case the viewing end 26 gets perceivably lighter in color as the illumination level of the ambient light increases.

The reference strip 28 is made from a printed or other material having a known, fixed optical density, (in this case, a specific color), defined by point B in FIG. 1(b), and more specifically shown in FIG. 1(c). The color of the reference strip preferably and according to this particular embodiment represents the color of the viewing end 26 at the minimum level of illumination for which the flash assembly 18 is not required. See FIG. 1(b).

In operation, and referring to FIGS. 1(a)–1(c), the user points the camera 10 toward the subject to be photographed in a manner conventionally known, whereby the user spots the subject through the viewfinder 16. The level of ambient light present for the scene to be photographed is received by the light gathering end 24, and is transmitted to the viewing end 26. The intensity of the transmitted light changes the optical density of the viewing end 26 in accordance with the linear relationship defined by FIG. 1(b). The user then compares the optical density (that is, the color) of the viewing end 26 with the optical density of the reference strip 28. If the color of the viewing end 26 is darker than the fixed color of the reference strip 28, as shown in the top example of FIG. 1(c), then an insufficient amount of light is present for image capturing and the flash assembly 18 should be charged for firing by the user by means of switch 19, prior to depressing the shutter release button 20. If on the other hand, the color of the viewing end 26 is lighter than or the same as that of the reference strip 28, then adequate ambient light is present to capture an image, and the user need only depress the shutter release button 20.

A second embodiment is herein described with reference to FIGS. 2(a) and 2(b). Similar parts used in the preceding embodiment are labeled with the same reference numerals for the sake of clarity.

Figure 2A:
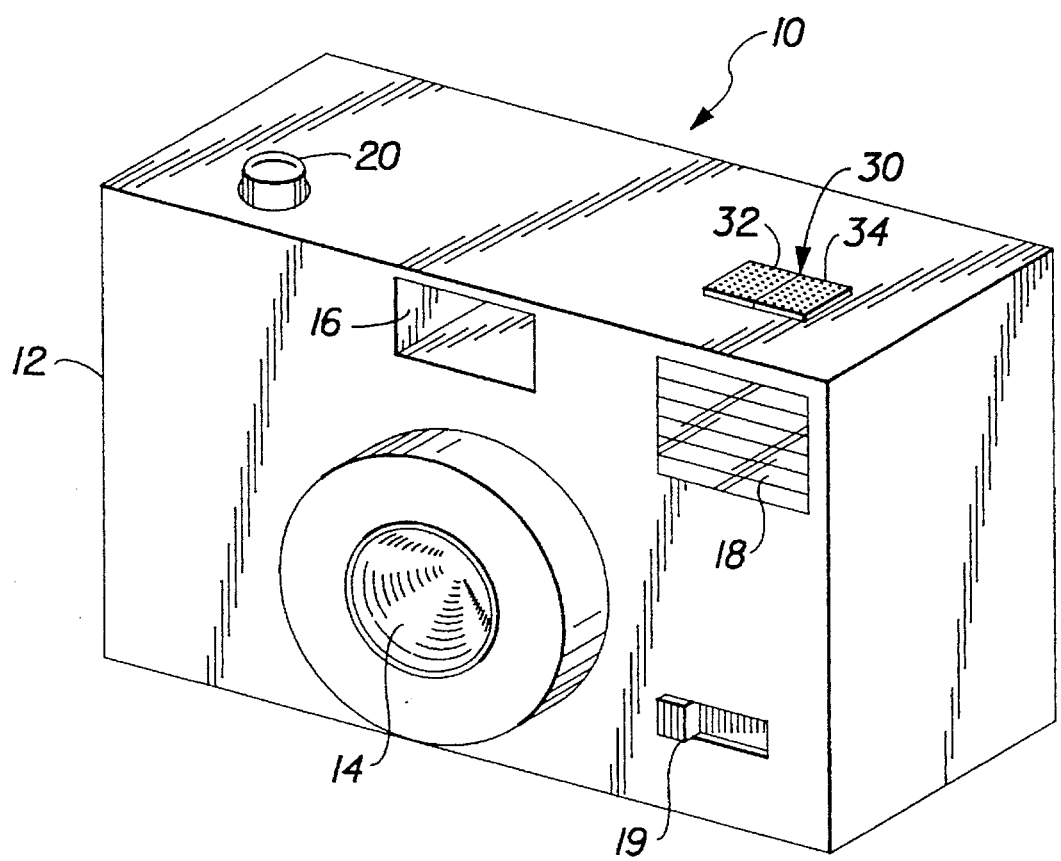
FIG. 2(a) is a front perspective view of the camera of FIGS. 1(a) having a flash indication aid according to a second embodiment of the present invention.
Figure 2B:
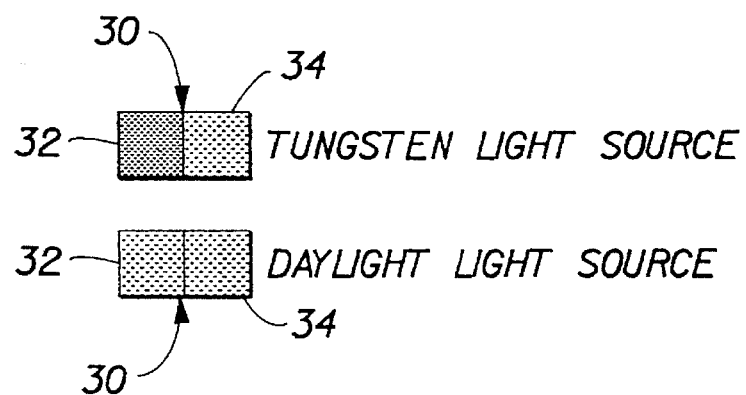
FIG. 2(b) is a comparative pictorial representation of the flash indication aid of FIG. 2(a), illustrating an example of the aid in use.

Referring specifically to FIG. 2(a), there is shown a camera 10, defined by a plastic body 12 and having a taking lens 14 attached to the front exterior portion of the body, as well as a viewfinder 16. The camera also includes a flash illumination assembly 18 which is charged for firing by an manually actuable switch 19 located on the front surface of the body 12, and a shutter release button 20 located on the top surface of the body. It should be readily apparent from the discussion presented that the locations of each of the photographic elements are not specifically limited; for example, the charge switch 19 could be located along a side surface or the top surface of the body 12.

Attached to the top surface of the body 12 is a flash indicating aid 30 which is adhered or otherwise attached to the camera 10. Preferably, according to this embodiment, the aid 30 consists of two visible and adjacently disposed portions 32, 34.

Portion 32, is made from a metamaric material, which varies in optical density based on the type of light source, as opposed to the level of illumination regardless of the light source as in the previous embodiment, thereby acting as a light sensing element. It is known that a high percentage of flash pictures are taken in environments illuminated by tungsten light sources, such as indoor overhead lighting. In this simplified example, portion 32 varies in optical density (in this case, color) differently when exposed to a tungsten lighting source, than when exposed to daylight conditions; that is, portion 32 becomes darker under a tungsten light source than under daylight conditions, for the same illumination level, see FIG. 2(b).

Adjacent portion 34, on the other hand, is made from a material having a fixed optical density which does not vary when other light sources, such as tungsten or daylight, are used. Preferably, as in the preceding embodiment, the optical density of portion 34 is equivalent to the optical density of portion 32 which is attained when a tungsten lighting source is used.

In use, the user points the taking lens 14 of the camera 10 at the subject to be photographed, as is conventionally known. Portion 32 being exposed to the ambient light conditions then undergoes a change in optical density (in this case, color) based on the type and level of ambient light available. In this particular example, portion 32 is darker than portion 34 when used in an environment using a tungsten light source versus a daylight light source in which portion 32 is lighter than or equal to the same color as portion 34. See FIG. 2(b).

A determination as to whether the flash assembly 18 should be charged by actuating switch 19 can then be made by the user by comparing the colors or shades of colors of the adjacent portions 32, 34. In this particular embodiment, if portion 32 is perceivably darker than reference portion 34, then the switch 19 should be actuated.

It should be readily apparent from the preceding discussion that the sensing element can be made from other materials can be introduced which vary depending on either/ or illumination levels and/or types of lighting which can be used as a sensing element. For example a metameric ink (not shown) can be applied to a printed reference strip in which a lettered message such as "TURN FLASH ON" will appear when exposed to tungsten lighting. This serves as a guide or reminder for the user to activate the flash prior to image capture.

It should also be understood that although the present invention has been described by way of the preferred embodiments, it is to be noted that various changes and modifications will be apparent to those skilled in the art. For example, a plurality of indicator aids could be placed on a camera with one or more reference standards to accommodate a myriad of possible lighting scenarios. Other similar combinations in the spirit and scope of the invention can also be contemplated.

PARTS LIST FOR FIGS. 1(a)–2(b)

10 camera
12 body
14 taking lens
16 viewfinder
18 flash assembly
19 switch
20 shutter release button
21 cavity
22 light pipe element
24 light receiving end
26 viewing end
28 reference strip
30 flash indication aid
32 metameric portion
34 reference portion

I claim:

1. Apparatus for a camera having a body and a manually operated flash assembly, is characterized by:

sensing means disposed on said camera body and made from a material having properties which vary depending on the amount of incident light striking the sensing means; and reference means having a specific property value for comparing to said sensing means for visually indicating whether said flash assembly should be powered, wherein said reference means includes a material having a known and fixed optical density, said reference means being disposed adjacent said sensing means to provide a comparative index.

2. Apparatus as recited in claim 1, wherein said sensing means comprises a material which varies in optical density depending on the amount of incident light impinging thereon.

3. Apparatus as recited in claim 1, wherein said sensing means comprises a material which is capable of changing color depending on the amount of incident light impinging thereon.

4. Apparatus as recited in claim 1, wherein said sensing means comprises a light-pipe element having a light-gathering first end for gathering ambient light, and a second viewing end having a visible portion made from said varying property material.

5. Apparatus as recited in claim 4, wherein said reference means comprises a section of material having a specific optical density which is disposed adjacent said viewing end.

6. Apparatus as recited in claim 4, in which the camera includes a taking lens attached to said body, wherein said light-pipe element is disposed within a cavity of the camera body and oriented such that the light gathering end is adjacent said taking lens.

7. Apparatus as claimed in claim 1, wherein said sensing means is made from a metameric material which varies in optical density depending on the type of illumination said material is exposed to.

8. Apparatus as recited in claim 1, wherein said sensing means is made from a photochromic material.

9. A method for using a camera having a manually activatable flash assembly, comprising the steps of:

reading the optical density of a displayed light sensing element made from a material which varies in optical density depending on the level of incident light impinging thereon;

comparing the optical density of the light-sensing element with that of an adjacently disposed reference standard having a fixed optical density; and activating the flash assembly if the optical density of the light sensing element is markedly different than that of the reference standard.

10. A method as recited in claim 9, wherein said light sensing element is made from a photochromic material which changes color depending on the level of ambient light striking said element, and in which the flash assembly should be activated if the color of the light sensing element is markedly different than the color of the reference standard.

* * * * *